US012147924B2

(12) United States Patent
Wicaksono et al.

(10) Patent No.: US 12,147,924 B2
(45) Date of Patent: Nov. 19, 2024

(54) METHOD AND SYSTEM FOR DYNAMIC ADAPTIVE ROUTING OF DEFERRABLE WORK IN A CONTACT CENTER

(71) Applicant: Genesys Cloud Services, Inc., Menlo Park, CA (US)

(72) Inventors: Bayu Wicaksono, Laurel, MD (US); Travis Humphreys, Crownsville, MD (US); William D'Attilio, Brownsburg, IN (US); Johnson Tse, Markham (CA); Abel Chen, Markham (CA)

(73) Assignee: Genesys Cloud Services, Inc., Menlo Park, CA (US)

( * ) Notice: Subject to any disclaimer, the term of this patent is extended or adjusted under 35 U.S.C. 154(b) by 220 days.

(21) Appl. No.: 17/491,398

(22) Filed: Sep. 30, 2021

(65) Prior Publication Data

US 2022/0101220 A1 Mar. 31, 2022

Related U.S. Application Data

(60) Provisional application No. 63/085,373, filed on Sep. 30, 2020.

(51) Int. Cl.
*G06Q 10/00* (2023.01)
*G06F 40/40* (2020.01)
(Continued)

(52) U.S. Cl.
CPC ......... *G06Q 10/0633* (2013.01); *G06F 40/40* (2020.01); *G06Q 10/063112* (2013.01);
(Continued)

(58) Field of Classification Search
None
See application file for complete search history.

(56) References Cited

U.S. PATENT DOCUMENTS

| | | | |
|---|---|---|---|
| 7,023,979 B1 * | 4/2006 | Wu | H04M 3/5233 379/265.11 |
| 7,382,773 B2 * | 6/2008 | Schoeneberger | H04L 51/222 379/265.09 |

(Continued)

FOREIGN PATENT DOCUMENTS

| | | |
|---|---|---|
| EP | 3483807 A1 | 5/2019 |
| WO | 2014093637 A2 | 6/2014 |
| WO | 2016048387 A1 | 3/2016 |

OTHER PUBLICATIONS

Koole, Ger, and Auke Pot. "An overview of routing and staffing algorithms in multi-skill customer contact centers." (2006) (Year: 2006).*

(Continued)

*Primary Examiner* — Gurkanwaljit Singh
(74) *Attorney, Agent, or Firm* — Taft Stettinius & Hollister LLP

(57) ABSTRACT

A method for optimizing a workflow of deferrable work interactions in a contact center that includes: providing a NLP models and a priority model; using text derived from received deferrable working interactions as inputs to the NLP models to generate the NLP scores; using the LP scores as inputs to the priority model to generate the priority score; identifying candidate agents of the agents for handling the deferrable work interactions; receiving an inbound work forecast; receiving agent work schedule data; using an optimization process to generate an optimized workflow for the deferrable work interactions, where the optimized workflow includes assignments in which an agent from the candidate agents is selected to handle the deferrable work interaction and a target timeframe for handling is scheduled; and routing the deferrable work interactions in accordance with the assignments of the optimized workflow.

20 Claims, 4 Drawing Sheets

(51) Int. Cl.
    *G06Q 10/0631*     (2023.01)
    *G06Q 10/0633*     (2023.01)
    *H04M 3/51*     (2006.01)
    *H04M 3/523*     (2006.01)

(52) U.S. Cl.
    CPC ....... *H04M 3/5175* (2013.01); *H04M 3/5233* (2013.01); *H04M 2203/402* (2013.01)

(56) References Cited

U.S. PATENT DOCUMENTS

| | | | | |
|---|---|---|---|---|
| 7,734,783 | B1* | 6/2010 | Bourke | H04L 67/1001 379/265.01 |
| 8,116,446 | B1* | 2/2012 | Kalavar | H04M 3/5232 379/265.01 |
| 10,484,542 | B1* | 11/2019 | Rager | G06F 40/279 |
| 10,554,817 | B1* | 2/2020 | Sullivan | H04L 41/5054 |
| 10,944,870 | B1* | 3/2021 | Paiva | H04M 3/5166 |
| 2004/0054743 | A1* | 3/2004 | McPartlan | H04M 3/5235 709/206 |
| 2004/0141508 | A1* | 7/2004 | Schoeneberger | H04L 51/04 370/352 |
| 2010/0172485 | A1* | 7/2010 | Bourke | H04L 67/1021 379/265.05 |
| 2014/0146961 | A1 | 5/2014 | Ristock et al. | |
| 2016/0173691 | A1 | 6/2016 | Wicaksono et al. | |
| 2016/0330325 | A1* | 11/2016 | Conway | H04M 3/5191 |
| 2017/0208177 | A1* | 7/2017 | Conway | H04M 3/523 |
| 2018/0097940 | A1* | 4/2018 | Beilis | H04M 3/5235 |
| 2020/0074363 | A1* | 3/2020 | Chan | H04L 41/5074 |
| 2021/0136210 | A1* | 5/2021 | Paiva | H04M 3/5166 |

OTHER PUBLICATIONS

Aldor-Noiman, Sivan, Paul D. Feigin, and Avishai Mandelbaum. "Workload forecasting for a call center: Methodology and a case study." The Annals of Applied Statistics 3.4 (2009): 1403-1447. (Year: 2009).*

Aksin, Zeynep, Mor Armony, and Vijay Mehrotra. "The modern call center: A multi-disciplinary perspective on operations management research." Production and operations management 16.6 (2007): 665-688. (Year: 2007).*

PCT International Search Report and Written Opinion regarding co-pending PCT application No. PCT/US2021/053032 mailed on Jan. 17, 2022.

International Preliminary Report on Patentability, IPEA/US, International Patent Application No. PCT/US2021/053032, Aug. 9, 2023, 18 pages.

* cited by examiner

METHOD AND SYSTEM FOR DYNAMIC ADAPTIVE ROUTING OF DEFERRABLE WORK IN A CONTACT CENTER

CROSS REFERENCE TO RELATED APPLICATION

This application claims the benefit of U.S. Provisional Patent Application No. 63/085,373, titled "METHOD AND SYSTEM FOR DYNAMIC ADAPTIVE ROUTING OF DEFERRABLE WORK IN A CONTACT CENTER", filed in the U.S. Patent and Trademark Office on Sep. 30, 2020, the contents of which are incorporated herein.

BACKGROUND

The present invention generally relates to telecommunications systems in the field of customer relations management including customer assistance via call or contact centers and internet-based service options. More particularly, but not by way of limitation, the present invention pertains to systems and methods for dynamic adaptive routing of deferrable work, such as email, in a contact center. The present invention further relates to optimizing a workflow in relation to deferrable work and factors such as a priority score of the deferrable work interactions and agent availability.

BRIEF DESCRIPTION OF THE INVENTION

The present invention thus includes a computer-implemented method for optimizing a workflow in a contact center in which deferrable work interactions are prioritized and assigned to agents for handling. The method may include the steps of: providing a plurality of natural language processing (NLP) models, each NLP model being configured to accept text from a given deferrable work interaction as an input and generate NLP scores indicating how the given deferrable work interaction rates in accordance with a characteristic; a priority model configured to accept as inputs the scores generated from the plurality of NLP models and generate a priority score related to a priority characteristic indicating how the given deferrable work interaction should be prioritized for handling relative to other ones of the deferrable work interactions; receiving the deferrable work interactions; using text derived from the deferrable working interactions as inputs to the plurality of NLP models to generate the NLP scores for each of the deferrable work interactions; using the generated NLP scores as inputs to the priority model to generate the priority score for each of the deferrable work interactions; using the generated NLP scores to identify one or more candidate agents of the agents for handling each of the deferrable work interactions; receiving an inbound work forecast for the contact center that predicts inbound work levels expected over one or more future work periods; receiving, in relation to the one or more future work periods, agent work schedule data describing anticipated work schedules for the agents; using an optimization process to generate an optimized workflow for the deferrable work interactions, wherein, for each of the deferrable work interactions, the optimized workflow comprises an assignment in which a selected agent is selected from the candidate agents for handling the deferrable work interaction and a target timeframe is scheduled for handling of the deferrable work interaction; and routing each of the deferrable work interactions in accordance with the assignments of the optimized workflow. The optimization process may be configured to optimize according to the following factors: the priority score generated for each of the deferrable work interactions; an expected availability over the one or more future work periods of the one or more candidate agents identified for each of the deferrable work interactions as determined from the agent work schedule data over the one or more future work periods and the predicted inbound work levels over the one or more future work periods given the inbound work forecast.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
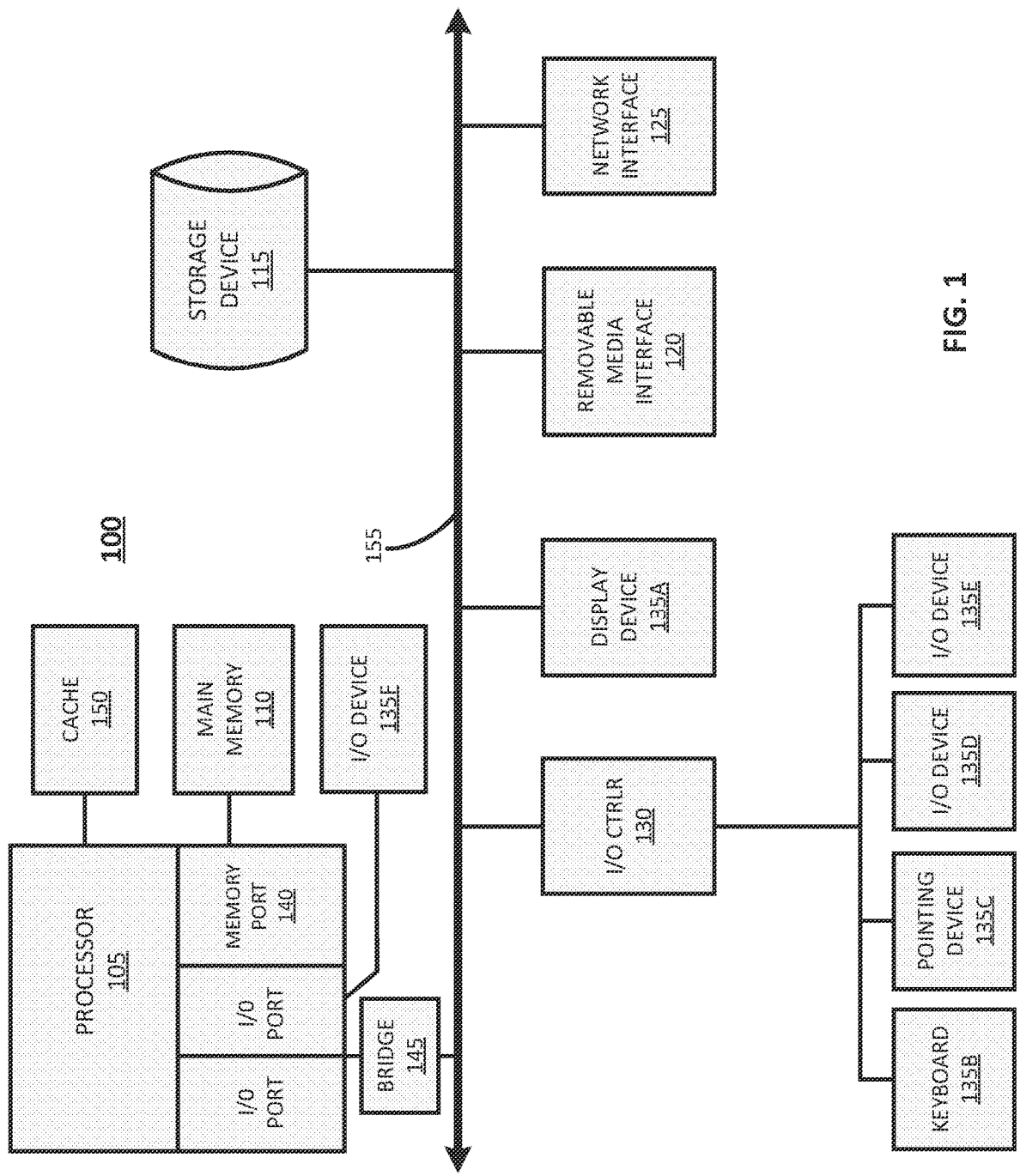
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein.

Contact Center

Figure 2:
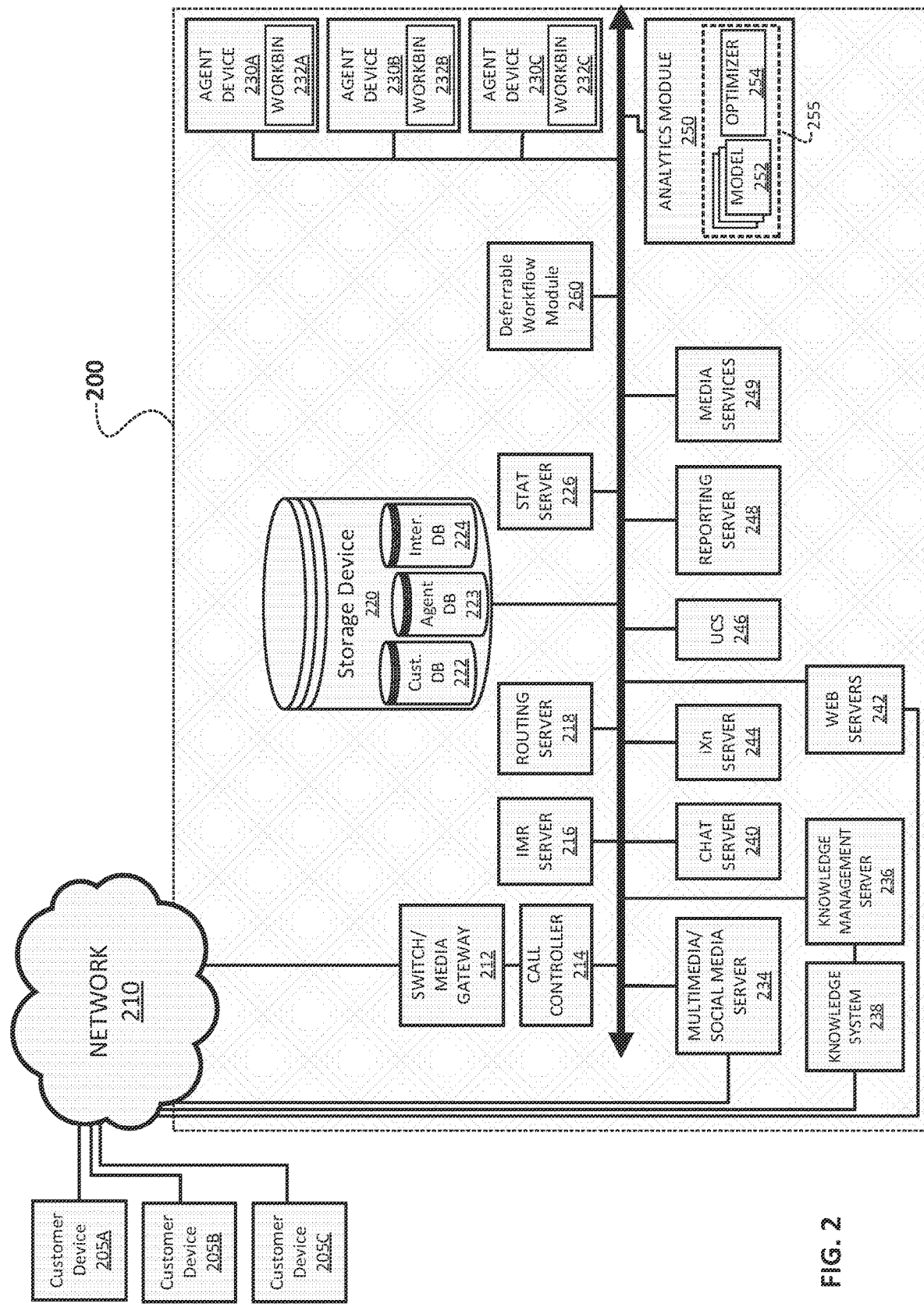
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; an analytics module 250; and a deferrable workflow module 260. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the deferrable work module 260, as discussed more below, it may optimize workflows related to deferrable work or deferrable work interactions. As will be appreciated, aspects of the analytics module 250 may be included within the deferrable work module 260 but, for the sake of avoiding repetition, will not be further discussed in relation to deferrable work module 260 unless required.

Figure 3:
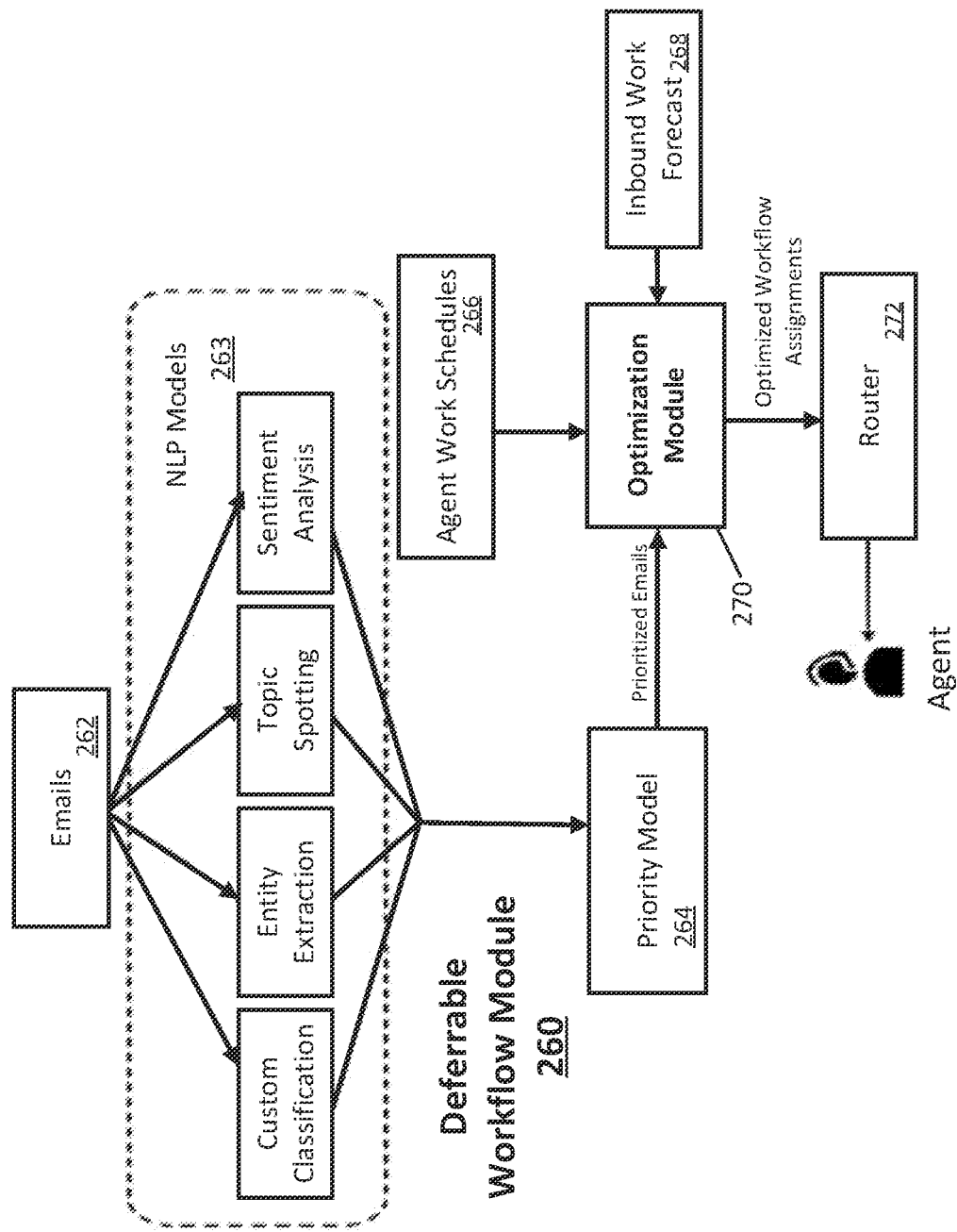
FIG. 3 is a schematic representation of an exemplary deferrable work module in accordance with exemplary embodiments of the present invention.
Figure 4:
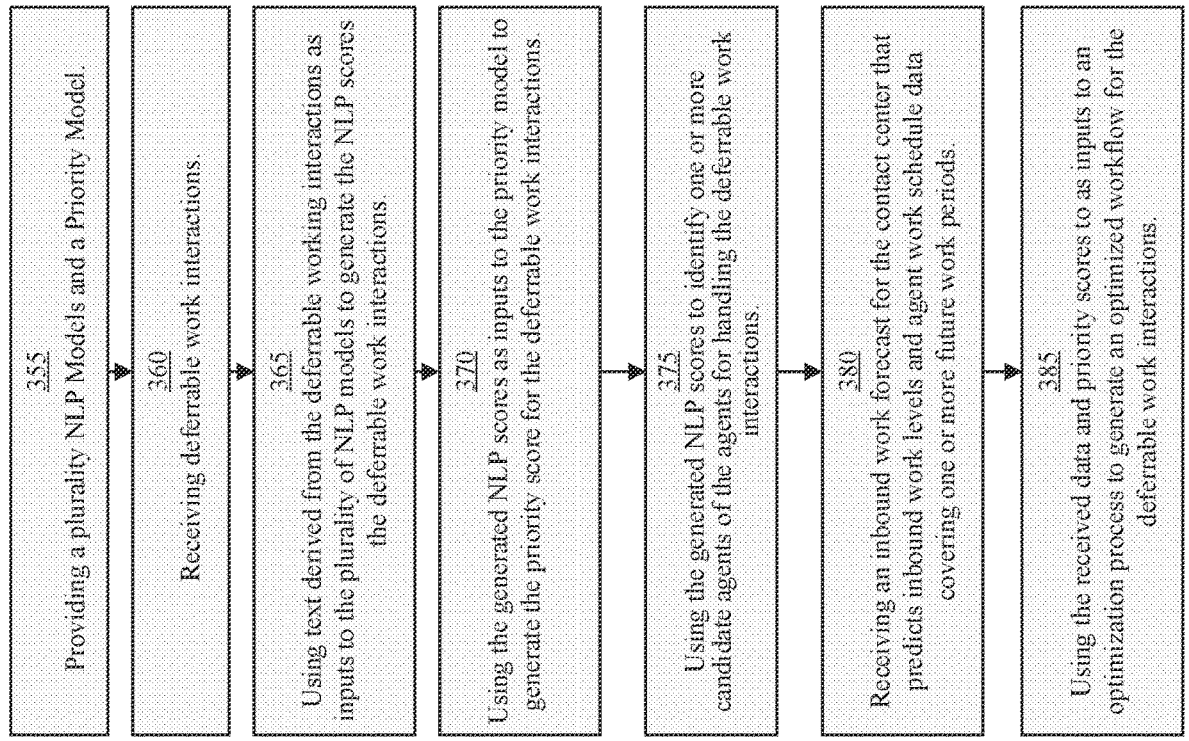
FIG. 4 is a method for providing an optimized workflow for deferrable work in accordance with exemplary embodiments of the present invention.

With reference now to FIGS. 3 and 4, the invention of the present disclosure will now be discussed more directly. As shown in FIG. 3, the present invention may include a deferrable workflow module 260. As indicated, the deferrable workflow module 260 may accept input derived from emails 262 (or other deferrable work interactions) and then process those emails via a plurality of natural language processing (NLP) models 263. The output from the NLP models 262 may be directed as input into a priority model 264. The output of the priority model 264 is then fed into an optimization module 270. The optimization module may receive other data and information, for example, an inbound work forecast from an inbound work forecast module 268 and agent work schedules from an agent work schedule module 266. The optimization module 270 may then generate an optimized workflow for deferrable work interactions. This optimized workflow may include optimized workflow assignments that are directed to a router 272 for routing to an identified agent. The functionality associated with this system will be discussed more below. First, background will be provided so that the difficulties associated with the handling of deferrable work are more fully appreciated.

As will be appreciated, contact centers handle many different types of customer interactions. One way in which the work associated with these interactions is classified is based on the required immediacy of the response. Work associated with responses that can be deferred ("deferrable work" or "deferrable work interactions") generally is work associated with customer interactions that are not required to be handled immediately. This type of work generally includes non-synchronous interactions involving text communications between a customer and an agent. As such work primarily relates to responding to customer emails, this type of work also may be referred to as "email work" or simply "emails". It should be understood, though, that deferrable work also may include other types of back-office work. At any rate, with deferrable work, response time is generally measured in hours or days. By contrast, immediate work, such as work associated with inbound calls or chats that includes synchronous voice or text exchanges has a higher urgency in that the communications must be handled immediately.

Given these differences, the planning for how deferrable work is handled within a contact center is substantially different than for immediate work. Unlike the nature of immediate work where unhandled interactions become abandoned and directly correlate to how tolerant customers are in the queue, unhandled emails do not become abandoned, but rather get passed as backlog from one work period to the next. Additionally, customers typically have much more patience in waiting for a reply due to the deferrable nature of emails. However, due to this deferrable nature, from an operational and optimization perspective, measuring performance characteristics related to deferrable work can be difficult and can lead to complex and problematic staffing problems.

In general, to effectively satisfy performance objectives related to deferrable work, such as emails, the following three performance characteristics must be understood and managed. The first of these characteristics is "response time". As used herein, "response time" is the time between when a customer initiates an interaction with the contact center, such as when the customer's email is received, and when the customer receives a response from an agent. The second performance characteristic is "backlog management". As used herein, "backlog management" refers to how the backlog of deferrable work is managed. The "backlog" of deferrable work refers to the accumulated total of emails that require a response. As will be seen, it is good practice to maintain a certain level of backlog from one work period to the next rather than fully clearing backlog. The third performance characteristic is "steady-state through rate of email s". This term refers to the rate at which emails are handled. This rate should be managed in relation to the rate of incoming emails to ensure consistent and on-time handling.

There are several difficulties that hinder the efficient handling of deferrable work. Typically, agents in contact centers are busy handling immediate work, such as calls and chats, and deferrable work is ignored. That is, inbound calls and chats "cut in line" in front of emails, and the emails get pushed further back in the queue. The backlog of emails can grow quickly. This rapid growth can produce an unmanageable email backlog if left unchecked. When email backlogs grow too large, agents have to hurriedly try to clear the backlog and, in such instances, emails that would otherwise be deemed important or high urgency could be missed or miss handled. Consequently, it is highly preferable that such emails are accurately characterized upfront. However, agents are generally required to handle such deferrable work in a "first in, first out" (FIFO) manner, and this prevents the efficient handling of more important or urgent emails. The FIFO rule can further frustrate the management of deferrable work when extended to apply equally to all types of media or channels. Another problem with deferrable work has to do with how agents typically schedule their day. Agents usually allocate a block of time at the beginning or end of their shift or week to handle email backlogs, rather than steadily handling them throughout the work period. Finally, the ability of agents to handle multiple emails and chats concurrently makes monitoring and managing their workload more complex and difficult.

To address these difficulties, the present disclosure teaches adaptive prioritization of emails, which leverages aspects of Natural Language Processing (NLP), with workload forecasting and agent availability to direct an optimum workflow for deferrable work. As will be seen, these practices may be used to promote an optimal delivery of services to customers as well as the efficient use of agents. In order to achieve this, a smart system is devised in which each deferrable work interaction, such as an email, is "read" and analyzed before it is assigned and routed to an agent. This, for example, includes analyzing the text of the email with NLP models to generate a measure of email significance or importance as well as urgency. Embodiments of the present invention then include using this gained contextual knowledge to integrate the assignment into the workday of agents in an optimized manner.

More specifically, a methodology is disclosed for ranking or scoring the priority, which may include aspects of importance and/or urgency, of a deferrable work interaction or email. This type of scoring may be referred to herein as a "priority score", or more specifically, as an "urgency score" or "importance score". One way to do this is to create training data (i.e., emails that are already verified as having a particular priority score) and then train a model so that such ratings may be calculated by the trained model as part of an automated rating process. As part of this process, business logic or rules may be derived that drive the definition of what constitutes an important or urgent email.

As an example, in accordance with preferred embodiments, the priority model is trained to score levels of urgency. In such cases, the urgency model may be trained so that the classification of whether an email is urgent is simplified by limiting the urgency scoring to two levels, i.e., either the email is scored as having high urgency or low urgency. The model may be trained in accordance with the presence of key words. Once trained, a keyword search of inbound emails then is used to classify the emails according to the two urgency categories. Thus, in a simplified example, if the key words "urgent" or "stolen" or "lost" appear in an inbound email, the email is given a "high urgency" score and, thereby, deemed urgent. If the key words are not found, then the email is given a "low urgency" score and, thereby, deemed not urgent. According to example embodiments, the priority model may be similarly trained to score levels of importance. Levels of importance may be learned based on the topics or intents found to be expressed in emails, for example, using the related data output from the NLP analysis. As will be seen, once this priority scoring, including the urgency and/or importance scoring, is completed, the present invention then translates this enhanced contextual understanding into agent workflow improvements. In doing this, difficult questions must still be addressed, such as "How far should high urgency emails be advanced in the email backlog queue?" or "How does the contact center ensure that agents are still answering low urgency emails?"

As will be appreciated, contact centers generally prompt agents to handle high urgency or importance emails before those having a low urgency or importance, as an overlooked urgent email poses a greater risk of producing a negative outcome. However, when routing such deferrable work interactions, the present invention takes into account a fuller set of criteria, which can alter the way emails are prioritized and handled. As an example, it is commonly understood that contact centers often operate under some type of service level agreement (SLA). As used herein, an SLA is a contract or other formalized arrangement that defines what services a service provider provides and the required level or standard for the delivery of those services. In the present context, an SLA may define contractual response time objectives or requirements and the negative economic consequences for not meeting them. That is, in contact center operations, an SLA may define hard response time requirements in relation to emails that, when not satisfied, have a negative economic impact for the contact center. In some instances, when the requirements of an SLA are taken into account and the associated economic impact, it may be that an email that is rated as having a low urgency is, in fact, at least from the perspective of the contact center, more urgent (in terms of direct economic impact) than one rated as having a high urgency. This may be the case where the email having the low urgency is closer to the defined limit or threshold for responding. Embodiments of the present invention takes such factors into account with assigning priority to emails in the backlog and optimizing a related workflow.

Further, from an efficiency perspective, embodiments of the present invention include ranking emails in accordance with the difficulty of the response (or "response difficulty"), as it has been found to be advantageous to group emails with like difficulty. For example, some inbound emails may be less difficult in that the response to them can be provided in batches (i.e., batch-replies) or the agent is able to employ a canned response in the response. Other inbound emails may be more difficult in that the agent must formulate a personalized response or the subject matter is more complex. In grouping such emails, for example, agents can decide to batch several less difficult emails before diving into a more difficult one. In accordance with another aspect of the present disclosure, emails may be grouped according to topic, which acts to minimize context switching and can increase an agent's rate of response.

Additionally, because organizations or businesses may have different definitions as to what constitutes a high priority email or, more specifically, an important or urgent email, the present disclosure includes methodologies for developing custom models, i.e., models adapted for use with particularly type of businesses or product lines, etc. As will be seen, this type of modeling provides flexibility to allow organizations to leverage various NLP text analytics to customize the definition of what emails have high and low priority. With the NLP text analysis results, a priority model is may be provided the different features and classifiers from those results as an input. The priority model may include both an urgency component (i.e., an urgency model), which generates an urgency score, and an importance component (i.e., an important model), which generates an importance score. The priority score then may be determined via a combination of the urgency score and the importance score. As discussed more below, the urgency and importance score may be weighted so to produce desired results. In some instances, businesses urgency may be weighted more than importance in calculating the priority score. In other cases, the opposite may be true. Thus, a priority score can then be determined from the priority model by combining various NLP model results. This "priority score" can then be used as a decision point by which emails in a queue are sorted or prioritized. This process is further covered below.

According to exemplary embodiments, such prioritization may be coupled with capabilities such as contact center workforce management, strategic capacity and tactical planning, modeling and optimization to produce optimized agent workflow plans, particularly related to how assignments of immediate and deferrable work are balanced. With reference to U.S. Pat. No. 9,906,648, the entire contents of which are hereby incorporated by reference herein, this may include mathematical programming optimization, queuing theory, simulation modeling, etc. In the multi-skilled world where agents are trained to handle different types of interactions and media types, it is imperative that agent utilizations, preferences, and skill proficiency are taken into account. And, with both deferrable and immediate work being in the mix, it is important that the prioritization of inbound calls and chats (i.e., the immediate work) in relation to emails (i.e., deferrable work) be both educated and measured. To this end, proper email assignment and management for routing purposes must also consider agent availability. In preferred embodiments, the present invention defers the routing of emails to a given agent until it is determined that the agent has completed a current task or has available bandwidth. Further, in routing assignments to an agent, the expected workload in their near future may be taken into account, for example, preferably deferring emails to a later time that avoids period of expected peak inbound volume. Accordingly, with present systems and methods, before a model inference matches an email to a particular agent, the time or availability dimension for that agent is considered. In this way, the best time for the most suitable agent to handle an email may be determined and an assignment made accordingly. To do this, and to provide an optimized result as well as a feedback loop to the system, predictions from workload forecasts and agent schedules are used during the optimization process. An exemplary contact center workflow utilizing these principles will now be discussed with reference to three different phases of implementation.

The first implementation phase is model building. Model building generally includes developing and training the necessary models. For example, a contact center may initially need to create and train NLP models and a priority model (which may include urgency and importance components) that are customed or applicable to a specific business or product line. As will be appreciated, contact centers may create such models for the different businesses it represents, with the models being trained to classifying business-specific emails. To do this, a contact center may label existing emails corresponding to NLP results and use these emails to train the NLP models. Once the NLP models are trained, a mechanism may also be provided for agents to label the validity of model outputs as part of their after-interaction workflow. This feedback loop may be used to improve the functioning of the models. Further, a nightly batched or ad-hoc model training mechanism may be run so that the priority model produces accurate scores that optimizes priority ratings for deferrable work interactions.

Once the models are developed and trained, a second phase may be instituted that generally includes using the model to calculate or generate priority scores for inbound emails or other types of deferrable work. This phase also includes gathering other information that is needed during the third phase to calculate an optimized deferrable work workflow (i.e., emails assignments and routing solutions). Within the second phase, the inbound emails and other deferrable work-type interactions may be processed as follows. First, the text of the incoming emails is scanned and/or otherwise input into the system and pre-processing is performed. Pre-processing may include removing personal identification information (PII), transforming or formatting the email text into an ingestible format, etc. Second, the inbound emails are processed via an automated workflow in which NLP is performed and the results are used to score a priority for each of the emails. The trained NLP models specified for the given business are accessed and each is used to analyze text derived from the emails and score the text in relation to a particular characteristic (such as relevancy, sentiment, etc.). Then, the outputs from the NLP models are provided as inputs to the priority model, which then scores the urgency and/or importance of the email. In this way, each email is assigned a priority score based on the combined analysis derived from the NLP models. As a next step, the group of emails may be re-sorted based on the priority score of the emails, with the emails having a higher priority generally being moved up in the queue and emails having a lower priority generally being moved down in the queue. As discussed more below, the priority scoring for the deferrable work interactions (i.e., emails) may include both an urgency and importance component.

As a next step within the second phase, the collected data, which may include the priority score and/or the scoring and information derived from the NLP analysis (for example, a determined intent, sentiment, relevancy to particular topics, subject matter, or products) may be provided as inputs to other provided modules to automatically derive other information that will be used to optimize the workflow. First, the collected data may be provided to a next-best-action module, which may be used to generate a recommended next action for each email. As will be appreciated, such recommended actions may be actions that the agent can recommend or implement toward resolving the issue identified in the email and/or responding to the email. Second, the collected data may be used by a predictive router to derive preferred agent characteristics, which may be used to identify candidate agents that are deemed to have a better chance of effectively handling the response to a particular email. In accordance with an example embodiment, the collected data from the NLP analysis is used to identify one or more candidate agents for handling the deferrable work interactions includes. This may include identifying preferred agent characteristics for each of the deferrable work interactions. Then the identified preferred agent characteristics are matched against known actual agent characteristics of the agents to determine one or more suitable or optimum matches. Multiple candidate agents may be identified so to allow greater flexibility during workflow optimization, in which the candidate agents are narrowed to a selected agent who is assigned to handle a particular deferrable work interaction.

Additional, other informational modules may be queried to determine necessary data. For example, a workload forecasting module may be consulted to acquire forecasts of expected levels of inbound work of one or more future work periods. As will be appreciated, this forecast may include expected levels of inbound immediate work (i.e., voice or chat interactions) for the contact center, which may be provided for the next several shifts, days, or weeks. This information may be used to determine inbound volume peaks and valleys so that agent availability may be determined. Specifically, the timing as to when the emails are routed or assigned to agents for handling may be optimized toward more opportune times (i.e., when the agent is not overly busy with handling immediate work). Also, along with the set of preferred agent characteristics for agents handling the emails, information may also be gathered from an agent scheduling module to obtain the future work schedules of the agents in the contact center over the relevant work periods. From this, insights may be gained into when particular agents will be working as well as time periods within those shifts when the agents may have available bandwidth to accept deferrable work.

In the third phase of implementation, the accumulated information is used in an optimization process in which an optimized workflow for deferrable work is produced. As part of the optimization, deferrable work assignments may be made matching particular emails to one or more preferred agents. Each such assignment may also include a targeted timeframe in which the assignment will be routed to the agent and a target timeframe in which the response will be completed by the agent. The optimization of such deferrable work assignments may take into account the several factors and criteria discussed, which, for example, may include consideration of the following aspects: the expected workload of immediate work in the future; 2) the expected time the agents will have available to handle deferrable work; and/or 3) which of the agent are more favorable for handling particular deferrable work interactions. Thus, the deferrable work assignments may be re-sorted based on their priority and assignments made according to an optimization taking into account agent availability, available bandwidth, and other limitations.

Further attention will now be paid to the natural language processing used to analyze and score deferrable work interactions, such as emails. As already described, the results or scoring provided by the natural language processing may be used as inputs for a priority model, which then scores or classifies deferrable work interactions according to a level of priority. As part of this discussion, an exemplary scenario will be used in which an email is received from a customer that requests rescheduling a flight that the customer previously booked. The rescheduling is being requested due to an event, such as a natural disaster, that occurred in the country to which the customer is traveling. As will be appreciated, in such instances, it is desirable that this type of email be quickly processed and accurately identified as having a high priority (in that the email has high importance and, depending on how far into the future the flight is scheduled, high urgency). As a result, the email should be prioritized in the email backlog and assigned/routed to a qualified agent for expeditious handling.

As an initial step in this process, the text of the email may be pre-processed. The pre-processing may be done in order to improve the function and accuracy of the models. As an example of pre-processing, the text may be cleaned via removing HTML tags, PII information, and/or stop words. Additionally, the lemmatization of words into the same base may be performed. Other pre-processing steps may be performed depending on the requirements of the NLP models being used.

In accordance with the present disclosure, the processed email text then may be provided as input for one or more NLP models. In accordance with a preferred embodiment, the present invention proposes using several NLP models, each of which analyzes different aspects or characteristics of the processed email text and produce an output score indicative of a measure of the corresponding characteristics. Specifically, NLP models are proposed that analyze along the following components: custom classification; entity extraction; topic spotting; and sentiment. Details of each of these will now be discussed.

The NLP model trained for custom classification determines whether the email is relevant or non-relevant at a high or course level to a general subject matter. For example, using the processed email text as input, the custom classification model may determine whether the email is relevant to a particular market or business or product. Thus, in the example scenario, the custom classification may determine whether an email is relevant to a marked or domain, such as to a travel domain. As will be appreciated, custom classification models that are used in another domain would be geared toward determining relevancy to the generalized subject matter corresponding to that domain. In the example scenario, the custom classification model may be trained via a first dataset that includes customer emails verified as being in the travel domain, which would represent a relevant category, and a second dataset that includes customer emails verified as not being in the travel domain, which represent a non-relevant category.

The NLP model for entity extraction generally functions by extracting entities from the processed email text. Examples of entities that are extracted include places or locations, dates, organizations, business, and/or people, etc. For example, with the entity extraction model, entities are extracted from the text and a score generated therefrom based on the number of occurrences of entities from a predefined list of entities. In the example scenario, a match with the particular country where the natural disaster occurred may produce an output score that is configured to increase the likelihood that the email urgency model classifies the email as being urgent.

Using an NLP model trained for topic spotting, one or more topics of the email may be determined. As will be appreciated, the topics covered in an email may be useful in scoring the urgency of it. Some examples of such topics are: balance inquiry; billing issue; canceling services; change of address; checking status; etc.

Once the entities are extracted and topics spotted, an approach such as term frequency-inverse document frequency (TF-IDF) and/or latent semantic analysis (LSF) may be used to obtain a sparse vector representation of the document. The TF-IDF and LSF analysis further may be used to identify or classify topics from a list of predefined topics. Other types of classifications are also possible. For example, emails may also be classified based on complaint categories, for example including such complaint categories as incorrect charges, late payment fees, or account issues. The subject of an email may further be classified according to intent. To improve this type of classification system over time, pointwise ranking system may be implemented. For example, the agent may mark an email as "Matching" (1) or "Non-matching" (0) after handling the email and update the category recommended by the system. A binary classification algorithm that leverages a random forest technique may be used to classify whether each email-category combination matches, based on the user trained data against the new email predicted, and the predicted category would be returned based on the highest scoring of the category.

As another step in the natural language processing of the email, an analysis of sentiment may be done to determine a sentiment rating or score of the email. The sentiment analysis may be performed by a trained sentiment model and, for example, be used to classify a given email as being positive, negative, neutral, or mixed. The sentiment analysis further may score the magnitude of the sentiment expressed. For example, the sentiment model may be trained via a training dataset of emails that are reviewed for certain attributes and verified for particular levels of sentiment by human reviewers. In accordance with certain embodiments, the sentiment model may base sentiment on detect one or more email attributes within the email. These attributes may include: Greeting; Backstory; Justification; Rant; Gratitude; and Express Emotion. In regard to the detection of such attributes, the sentiment model may develop mapping statements or rules that apply the detection of such attributes to the likelihood of a sentiment. For example, an example mapping statement may include one in which a Rant detected with an Express Emotion is indicative of a negative sentiment or strong negative sentiment. Sentiment magnitude may be judged in relation to email length, with the length of the email be made to positively correlate with the sentiment magnitude. Another example mapping statement may include one in which detecting Gratitude is indicative of a positive sentiment. Another example mapping statement may include one in which a Backstory detected with a Justification is indicative that a multiplier as to the positive or negative scoring that is applied.

The disclosure will now focus on scoring, ranking, queueing and routing deferrable work interactions as part of an optimized workflow. Typically, all interactions, both immediate and deferrable, are scored using the same function that is limited to considering urgency. The interaction that is scored as having the highest urgency is moved to the front of the queue and is handled first. This approach may work in relation to immediate work interactions but, as will be seen, is not efficient for queues involving deferrable work interactions.

According to exemplary embodiments of the present invention, an improved deferrable work scoring function is proposed that optimizes according to several specific factors, which may be expressed as part of an overall priority score. A first of these factors is urgency of the email and may be expressed as an urgency score. As stated, the urgency score is an indication of how quickly the response needs to be provided. The urgency score may be based on the results of the above-described NLP analysis, with the provided inputs from this analysis that indicate urgency level being learned from a training dataset. A second of these factors is an importance of the email and may be expressed as an importance score. A third factor is a time-to-threshold factor. As used herein, the time-to-threshold factor is a measure that takes into account the amount of remaining time the contact center has to handle the deferrable work interaction while still being in within the requirements of a governing SLA that prescribes response time limits. A fourth factor is referred to as an overall standing factor. As used herein, the overall standing factor is a measure indicating a real-time or current overall standing the contact center has in relation to a plurality of service requirements defined in a governing SLA. Thus, the overall standing factor looks not only at the contact center's standing in relation to responding to a pending one of the emails but is indicative of the contact center's overall standing in relation to, for example, terms relating to multiple channels or media types, each of which might have different requirements or limits. If a contact center is under-performing in relation how the SLA defines service requirements for a particular media or channel, such as email, then the overall standing factor may be scored at a value to increase the priority of handling interactions from that particular channel.

Of course, prioritizing contact center backlogs or queues that have both immediate and deferrable work can become quite complicated. In accordance with example embodiments, certain assumptions may be formulated that provide shortcuts that furthers this process. For example, as discussed, distinction may be made between urgency versus importance. That is, a particular email response may be very significant or important, making the response of high importance, but the urgency of the response may be quite low due to the fact that the customer is not expecting a response immediately. The sorting of queues may include a setting where urgency trumps importance for sorting, or vice-versa. Further, immediate work may be automatically provided a high urgency score so that, in most circumstances, immediate work is handled before deferrable work. Also, in relation the service categories and requirements defined in an SLA, present systems may have an operation in which, for any two interactions that are able to be differentiated as being in different SLA categories, the interaction in the category in which the contact center is under performing is that one that is prioritized. Related to this, a calculation may be made as to the benefit received by the contact center for prioritizing each of the interactions. The prioritization that results in the greatest benefit to the contact center's performance per the requirements of the SLA would then be the one that is prioritized for earlier handling.

Additionally, per embodiments of the present invention, the handling of deferrable work is not only about the order interactions are handled but also when they are handled. For example, the following considerations may be used in determining the timing of when the interactions are routed to the agents and when the response is completed. Such timing may include a target timeframe during which the routing of the assignment is scheduled and a timeframe during which the agent is expected to handle the deferrable work assignment. A first of these considerations is immediate occupancy. Immediate occupancy, as used herein, refers to the ratio of how many agents that are available relative to the amount of immediate work is forecasted. According to preferred embodiments, deferrable work is scheduled when the value of that ratio is indicative of the agents having enough time to both handle the expected immediate work and a certain level of deferrable work. Also, the timing of the deferrable work assignments should keep agents busy and not idle, while also maintaining the backlog of deferrable work from growing. Further, once the time-to-threshold factor for a particular deferrable work assignment, such as an email, reaches a certain level, for example equal to or less than 15 minutes, that particular assignment may be treated by the present system as an immediate work assignment.

The following discussion will provide some greater explanation as to an exemplary scoring function that may be used by the present system to prioritize deferrable work interactions, which are then used to optimize a related workflow. According to one approach, interactions are scored via a scoring function that calculates a modified time-in-queue (or "modified TIQ"). With this approach, the actual time that an interaction is in queue is tracked with that duration then being modified (via additions, subtractions, multiplier, etc.) per an amount that is indicative of an importance level. For example, the scoring formula may be that the modified time-in-queue equals the actual time-in-queue (or "actual TIQ") plus an importance multiplier times 60 seconds, or:

modified TIQ=(actual TIQ)+(importance multiplier*60 s)

The importance multiplier, for example, may be between 1 and 10. So, when the importance multiplier equals 4 in relation to an interaction, the result is that 240 second are added to the actual time-in-queue to ascertain the modified time-in-queue.

In accordance with an alternative embodiment, the priority scoring function may be modified to further include an urgency score. For example, the scoring function may be:

modified TIQ=(actual TIQ)+(importance multiplier*60 s)+(urgency multiplier*600 s)

In this case, the urgency multiplier may include high, medium, and low scoring values, or 4, 2, and 0, respectively. With this configuration, interactions having a high urgency generally trump those having a high importance. In accordance with other embodiments, the relative values assigned to importance and urgency can be changed to produced desired outcomes. Further, the scoring system could incorporate other factors, including the time to threshold factor and/or the overall standing factor. According to exemplary embodiments, the scoring function may be configured to function in accordance with the service requirements outlined in an SLA.

The systems and methods of the present disclosure offer several benefits over conventional systems. The accurate classification of deferrable work by urgency will improve overall contact center performance. Present systems and methods further enable emphasizing performance per requirements defined in an SLA to improve performance. Further, by ensuring that the most urgent emails are handled, customer satisfaction scores and net promoter scores will improve. More consistent occupancy levels and backlog management are also promoted. Finally, the more even and timely assignments of email to agents should improve agent performance and job satisfaction while also lowering turnover.

With reference to FIG. 4, a method 350 is provided in accordance with a preferred embodiment. The method 350 relates to optimizing a workflow in a contact center in which deferrable work interactions are prioritized and assigned to agents for handling. The deferrable work interactions, for example, may be an email communication sent by a customer that requests a response from the contact center.

At step 355, the method 350 includes the step of a plurality of natural language processing (NLP) models and a priority model. Each of the NLP model may be configured to accept text from a given deferrable work interaction as an input and generate NLP scores indicating how the given deferrable work interaction rates in accordance with a characteristic. The priority model may be configured to accept as inputs the scores generated from the plurality of NLP models and generate a priority score related to a priority characteristic indicating how the given deferrable work interaction should be prioritized for handling relative to other ones of the deferrable work interactions.

At step 360, the method 350 may include receiving the deferrable work interactions. This may include the previously discussed pre-processing steps.

At step 365, the method 350 may include using text derived from the deferrable working interactions as inputs to the plurality of NLP models to generate NLP scores for each of the deferrable work interactions. The plurality of NLP models may include a model trained for to determine relevancy to at least one of a particular business or product. The plurality of NLP models may include one or more models trained to extract entities and/or identify topics in the deferrable work interaction. In such cases, the step of generating the NLP scores further includes generating, from the extracted entities or the identified topics, a sparse vector representation of each of the deferrable work interaction and, based on the sparse vector representation, classifying the deferrable work interaction in accordance with a predefined list of topic categories or complaint categories. The plurality of NLP models may include a model trained to provide a sentiment score classifying the deferrable work interaction as having a sentiment that is positive, negative, neutral, or mixed and a magnitude related thereto.

At step 370, the method 350 may include using the generated NLP scores as inputs to the priority model to generate the priority score for each of the deferrable work interactions. The priority model may include an urgency component that provides an urgency score and an importance component that provides an importance score. The priority score may be derived from a weighted combination of both the urgency score and the importance score.

At step 375, the method 350 may include using the generated NLP scores to identify one or more candidate agents of the agents for handling each of the deferrable work interactions. The step of using the generated NLP scores to identify the one or more candidate agents for handling each of the deferrable work interactions may include: identifying preferred agent characteristics for each of the deferrable work interactions; and comparing the identified preferred agent characteristics against actual agent characteristics of the agents and determining the one or more candidate agents as being ones of the agents having a most favorable match. The preferred agent characteristics are defined as being agent characteristics found to more likely produce a favorable outcome given a characteristic of a given deferrable work interaction.

At step 380, the method 350 may include receiving an inbound work forecast for the contact center that predicts inbound work levels and agent work schedule data covering one or more future work periods. Specifically, an inbound work forecast for the contact center may be received that predicts inbound work levels expected over the one or more future work periods. The inbound work forecast may include predictions as to an inbound work levels of immediate work interactions expected over the one or more future work periods. An immediate work interaction may be defined as a synchronous interaction involving a real-time exchange of text or voice between one of the agents and a customer. Further, in relation to the one or more future work periods, agent work schedule data may be received that describes anticipated work schedules for the agents.

At step 385, the method 350 may include the step of using the received data and priority scores to as inputs to an optimization process to generate an optimized workflow for the deferrable work interactions. The generated optimized workflow may include, for each of the deferrable work interactions, assignment in which a selected agent is selected from the candidate agents for handling the deferrable work interaction and a target timeframe is scheduled for handling of the deferrable work interaction. The optimization process may be configured to optimize according to the following factors: the priority score generated for each of the deferrable work interactions; and an expected availability over the one or more future work periods of the one or more candidate agents identified for each of the deferrable work interactions. The expected availability may be determined from: the agent work schedule data over the one or more future work periods; and the predicted inbound work levels over the one or more future work periods given the inbound work forecast. Once that final step is complete, the process may end with the routing of the deferrable work interactions pursuant to the assignments of the optimized workflow.

In accordance with alternative embodiments, other factors may be considered in the optimization. For example, in certain embodiments, the method further includes the step of determining, for each of the deferrable work interactions, a response deadline indicating a threshold for responding to the deferrable work interaction. In such cases, the factors that the optimization process considers may further include the response deadline determined for each of the deferrable work interactions. In certain embodiments, the method further includes the step determining, for each of the deferrable work interactions, a negative economic impact to the contact center for not responding to the deferrable work interaction before the threshold. In such cases, the factors that the optimization process considers may further include the negative economic impact determined for each of the deferrable work interactions. The response deadline and the negative economic impact may be determined according to terms defined in a service level agreement (SLA) that governs requirements as to how the contact center responds to the deferrable work interactions.

In certain embodiments, the method may further include the step of sorting the deferrable work interactions according to a relative value of the priority scores. In such cases, the factors that the optimization process considers further includes the order of the deferrable work interactions given the sorting. Additionally, the factors that the optimization process considers may further include a current backlog level of the deferrable work interactions.

In certain embodiments, the method may further include: for each of the deferrable work interactions, receiving from the agent assigned to handle the response, an agent provided priority score; and using a comparison between the agent provided priority score and the priority score of the deferrable work interaction to update a training of the priority model.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof That which is claimed:

1. A computer-implemented method for optimizing a workflow in a contact center in which deferrable work interactions are prioritized and assigned to agents for handling, wherein the method comprises the steps of:
   providing:
      a plurality of natural language processing (NLP) models, each NLP model being configured to accept text from a given deferrable work interaction as an input and generate NLP scores indicating how the given deferrable work interaction rates in accordance with a characteristic, wherein to generate the NLP scores of the given deferrable work interaction, each NLP model generates a sparse vector representation of the given deferrable work interaction;
      a priority model configured to accept as inputs the scores generated from the plurality of NLP models and generate a priority score related to a priority characteristic indicating how the given deferrable work interaction should be prioritized for handling relative to other ones of the deferrable work interactions;
   receiving the deferrable work interactions;
   using text derived from the deferrable working interactions as inputs to the plurality of NLP models to generate the NLP scores for each of the deferrable work interactions;
   using the generated NLP scores as inputs to the priority model to generate the priority score for each of the deferrable work interactions;
   using the generated NLP scores to identify one or more candidate agents of the agents for handling each of the deferrable work interactions;
   receiving an inbound work forecast for the contact center that predicts inbound work levels expected over one or more future work periods;
   receiving, in relation to the one or more future work periods, agent work schedule data describing anticipated work schedules for the agents;
   using an optimization process to generate an optimized workflow for the deferrable work interactions, wherein, for each of the deferrable work interactions, the optimized workflow comprises an assignment in which a selected agent is selected from the candidate agents for handling the deferrable work interaction and a target timeframe is scheduled for handling of the deferrable work interaction; and
   routing each of the deferrable work interactions in accordance with the assignments of the optimized workflow;
   wherein the optimization process is configured to optimize according to the following factors:
      the priority score generated for each of the deferrable work interactions;
      an expected availability over the one or more future work periods of the one or more candidate agents identified for each of the deferrable work interactions as determined from:
         the agent work schedule data over the one or more future work periods; and
         the predicted inbound work levels over the one or more future work periods given the inbound work forecast.

2. The method of claim 1, wherein the deferrable work interactions each comprises an email communication sent by a customer that requests a response from the contact center.

3. The method of claim 2, further comprising the step of:
   determining, for each of the deferrable work interactions, a response deadline indicating a threshold for responding to the deferrable work interaction;
   wherein the factors that the optimization process considers further includes the response deadline determined for each of the deferrable work interactions.

4. The method of claim 3, further comprising the step of:
   determining, for each of the deferrable work interactions, a negative economic impact to the contact center for not responding to the deferrable work interaction before the threshold;
   wherein the factors that the optimization process considers further includes the negative economic impact determined for each of the deferrable work interactions.

5. The method of claim 4, wherein the response deadline and the negative economic impact are determined according to terms defined in a service level agreement (SLA) that governs requirements as to how the contact center responds to the deferrable work interactions.

6. The method of claim 2, wherein the priority model comprises:
   an urgency component that provides an urgency score; and
   an importance component that provides an importance score;
   wherein the priority score is derived from a weighted combination of both the urgency score and the importance score.

7. The method of claim 2, wherein the inbound work forecast comprises predictions as to an inbound work levels of immediate work interactions expected over the one or more future work periods;
   wherein an immediate work interaction is defined as a synchronous interaction involving a real-time exchange of text or voice between one of the agents and a customer.

8. The method of claim 2, wherein the step of using the generated NLP scores to identify the one or more candidate agents for handling each of the deferrable work interactions includes:

identifying preferred agent characteristics for each of the deferrable work interactions; and
comparing the identified preferred agent characteristics against actual agent characteristics of the agents and determining the one or more candidate agents as being ones of the agents having a most favorable match;
wherein the preferred agent characteristics are defined as being agent characteristics found to more likely produce a favorable outcome given a characteristic of a given deferrable work interaction.

9. The method of claim 2, wherein the factors that the optimization process considers further includes:
a current backlog level of the deferrable work interactions.

10. The method of claim 2, wherein the plurality of NLP models includes a model trained for to determine relevancy to at least one of a particular business or product.

11. The method of claim 2, wherein the plurality of NLP models includes one or more models trained to at least one of extract entities and identify topics in the deferrable work interaction;
wherein of generating the NLP scores further comprises generating, from the extracted entities or the identified topics, the sparse vector representation of each deferrable work interaction and, based on the sparse vector representation, classifying the deferrable work interaction in accordance with a predefined list of topic categories or complaint categories.

12. The method of claim 2, wherein the plurality of NLP models includes a model trained to provide a sentiment score classifying the deferrable work interaction as having a sentiment that is positive, negative, neutral, or mixed and a magnitude related thereto.

13. The method of claim 2, further comprising the steps of:
for each of the deferrable work interactions, receiving from the agent assigned to handle the response, an agent provided priority score; and
using a comparison between the agent provided priority score and the priority score of the deferrable work interaction to update a training of the priority model.

14. The method of claim 2, further comprising the step of:
sorting the deferrable work interactions according to a relative value of the priority scores;
wherein the factors that the optimization process considers further includes an order of the deferrable work interactions given the sorting.

15. A system related to optimizing a workflow in a contact center in which deferrable work interactions are prioritized and assigned to agents for handling, the system comprising:
a processor; and
a memory, wherein the memory stores instructions that, when executed by the processor, cause the processor to perform the steps of:
providing:
a plurality of natural language processing (NLP) models, each NLP model being configured to accept text from a given deferrable work interaction as an input and generate NLP scores indicating how the given deferrable work interaction rates in accordance with a characteristic, wherein to generate the NLP scores of the given deferrable work interaction, each NLP model generates a sparse vector representation of the given deferrable work interaction;
a priority model configured to accept as inputs the scores generated from the plurality of NLP models and generate a priority score related to a priority characteristic indicating how the given deferrable work interaction should be prioritized for handling relative to other ones of the deferrable work interactions;
receiving the deferrable work interactions;
using text derived from the deferrable working interactions as inputs to the plurality of NLP models to generate the NLP scores for each of the deferrable work interactions;
using the generated NLP scores as inputs to the priority model to generate the priority score for each of the deferrable work interactions;
using the generated NLP scores to identify one or more candidate agents of the agents for handling each of the deferrable work interactions;
receiving an inbound work forecast for the contact center that predicts inbound work levels expected over one or more future work periods;
receiving, in relation to the one or more future work periods, agent work schedule data describing anticipated work schedules for the agents;
using an optimization process to generate an optimized workflow for the deferrable work interactions, wherein, for each of the deferrable work interactions, the optimized workflow comprises an assignment in which a selected agent is selected from the candidate agents for handling the deferrable work interaction and a target timeframe is scheduled for handling of the deferrable work interaction; and
routing each of the deferrable work interactions in accordance with the assignments of the optimized workflow;
wherein the optimization process is configured to optimize according to the following factors:
the priority score generated for each of the deferrable work interactions;
an expected availability over the one or more future work periods of the one or more candidate agents identified for each of the deferrable work interactions as determined from:
the agent work schedule data over the one or more future work periods; and
the predicted inbound work levels over the one or more future work periods given the inbound work forecast.

16. The system of claim 15, wherein the deferrable work interactions each comprises an email communication sent by a customer that requests a response from the contact center;
wherein the memory further stores instructions that, when executed by the processor, cause the processor to perform the step of:
determining, for each of the deferrable work interactions, a response deadline indicating a threshold for responding to the deferrable work interaction;
determining, for each of the deferrable work interactions, a negative economic impact to the contact center for not responding to the deferrable work interaction before the threshold;
wherein the factors that the optimization process considers further includes the response deadline determined for each of the deferrable work interactions and the negative economic impact determined for each of the deferrable work interactions.

17. The system of claim 15, wherein the priority model comprises:
- an urgency component that provides an urgency score; and
- an importance component that provides an importance score;
- wherein the priority score is derived from a weighted combination of both the urgency score and the importance score.

18. The system of claim 15, wherein the inbound work forecast comprises predictions as to an inbound work levels of immediate work interactions expected over the one or more future work periods; and
- wherein an immediate work interaction is defined as a synchronous interaction involving a real-time exchange of text or voice between one of the agents and a customer.

19. The system of claim 15, wherein the step of using the generated NLP scores to identify the one or more candidate agents for handling each of the deferrable work interactions includes:
- identifying preferred agent characteristics for each of the deferrable work interactions; and
- comparing the identified preferred agent characteristics against actual agent characteristics of the agents and determining the one or more candidate agents as being ones of the agents having a most favorable match;
- wherein the preferred agent characteristics are defined as being agent characteristics found to more likely produce a favorable outcome given a characteristic of a given deferrable work interaction.

20. The system of claim 15, wherein the plurality of NLP models includes a model trained for to determine relevancy to at least one of a particular business or product;
- wherein the plurality of NLP models includes one or more models trained to at least one of extract entities and identify topics in the deferrable work interaction; and
- wherein the plurality of NLP models includes a model trained to provide a sentiment score classifying the deferrable work interaction as having a sentiment that is positive, negative, neutral, or mixed and a magnitude related thereto.

* * * * *